Figure 1:
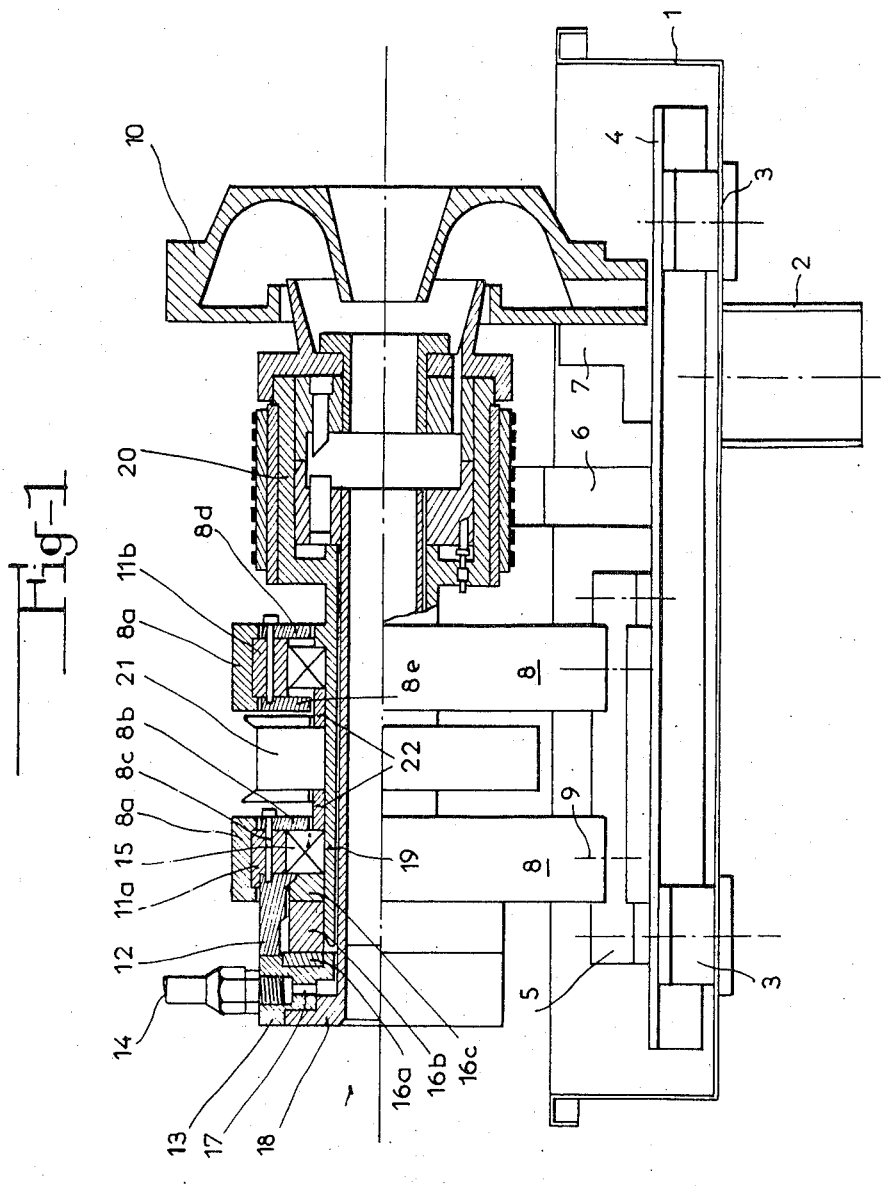

United States Patent
Dory

[11] 3,791,201
[45] Feb. 12, 1974

[54] ULTRASONIC TESTING DEVICE
[75] Inventor: Jacques Dory, Meaux, France
[73] Assignee: Realisations Ultrasoniques, Paris, France
[22] Filed: Aug. 19, 1972
[21] Appl. No.: 173,123

[30] Foreign Application Priority Data
Aug. 21, 1970 France .................. 7030710

[52] U.S. Cl. .................. 73/67.8 S, 73/71.50
[51] Int. Cl. .................. G01n 29/04
[58] Field of Search .................. 73/67.8, 71.5

[56] References Cited
UNITED STATES PATENTS
3,121,324  2/1964  Cowan .................. 73/67.8 X
3,107,521  10/1963  McClure .................. 73/67.8
3,455,150  7/1969  Wood .................. 73/67.8 X Primary Examiner—Richard C. Queisser
Assistant Examiner—Arthur E. Korkosz
Attorney, Agent, or Firm—William A. Drucker

[57] ABSTRACT

Improvement to devices for ultrasonic testing and measurement of a cylindrical product by helicoidal exploration of the product.

A rotary head comprising transducers placed in a radial chamber is so positioned that each transducer faces a mirror and that the ultrasonic ray is reflected at a suitable angle on to the part under test, the chamber remaining filled with water by centrifugal force.

For application to dimensional testing and fault-seeking in industrially manufactured tubes or bars.

3 Claims, 3 Drawing Figures

ULTRASONIC TESTING DEVICE

The invention relates to an improved device for ultrasonic testing and measurement of a finished product such as a cylindrical bar or tube.

Already known are testing machines wherein one or several ultrasonic transducers or probes rotate around the bar to be explored, while the latter moves forward, thus effecting a helicoidal exploration. To ensure suitable acoustic coupling, it is moreover necessary for the space separating the probes from the part to be filled with water or another liquid. However, on the one hand, it is not easy to prevent the filling water from leaking around the part to be tested and, on the other hand, when the probe is radially positioned, it has to be included in a large-diameter rotor, thus generating a great deal of inertia.

The invention remedies these disadvantages. It provides a device with a rotary testing and measurement head wherein the probes are brought as close as possible to the surface of the product to be tested, the rotary part which contains them having a smaller diameter. Moreover, it allows very easy replacement of the probes, which are removably mounted, by changing them for pre-set, inexpensive components.

In the ultrasonic testing device, which comprises transducers or probes mounted in a rotary chamber extending radially in a rotary block, the chamber containing an acoustic coupling liquid and the part to be tested is placed in the rotary block, while the probes are electrically connected to an external measurement device via rings and brushes, in accordance with the invention each probe is coupled to a mirror, the probe and the mirror being mounted facing each other in the opposite walls of the chamber and in such a way as to reflect the ultrasonic beam at a suitable angle on to the surface of the cylindrical product, the liquid feed to the chamber being effected centrally around said product so that the chamber is always kept filled by centrifugal force.

Preferably, the probe and the mirror are placed on the same axis parallel to the axis of the bar to be tested.

In accordance with another characteristic of the invention, the water feed is provided by means of an annular space between the rotary block and the outside surface of a tube acting as a stationary guide for the part to be tested, or by means of an annular space formed in the tube itself, said tube, contrary to the rotary block, being integral with a stationary part of the machine.

Other peculiarities of the invention will emerge from the following description, given as an example of embodiment, with, in the attached drawings:

FIG. 1, an elevation with a partial longitudinal section of the testing machine in accordance with the invention.

Figure 2:
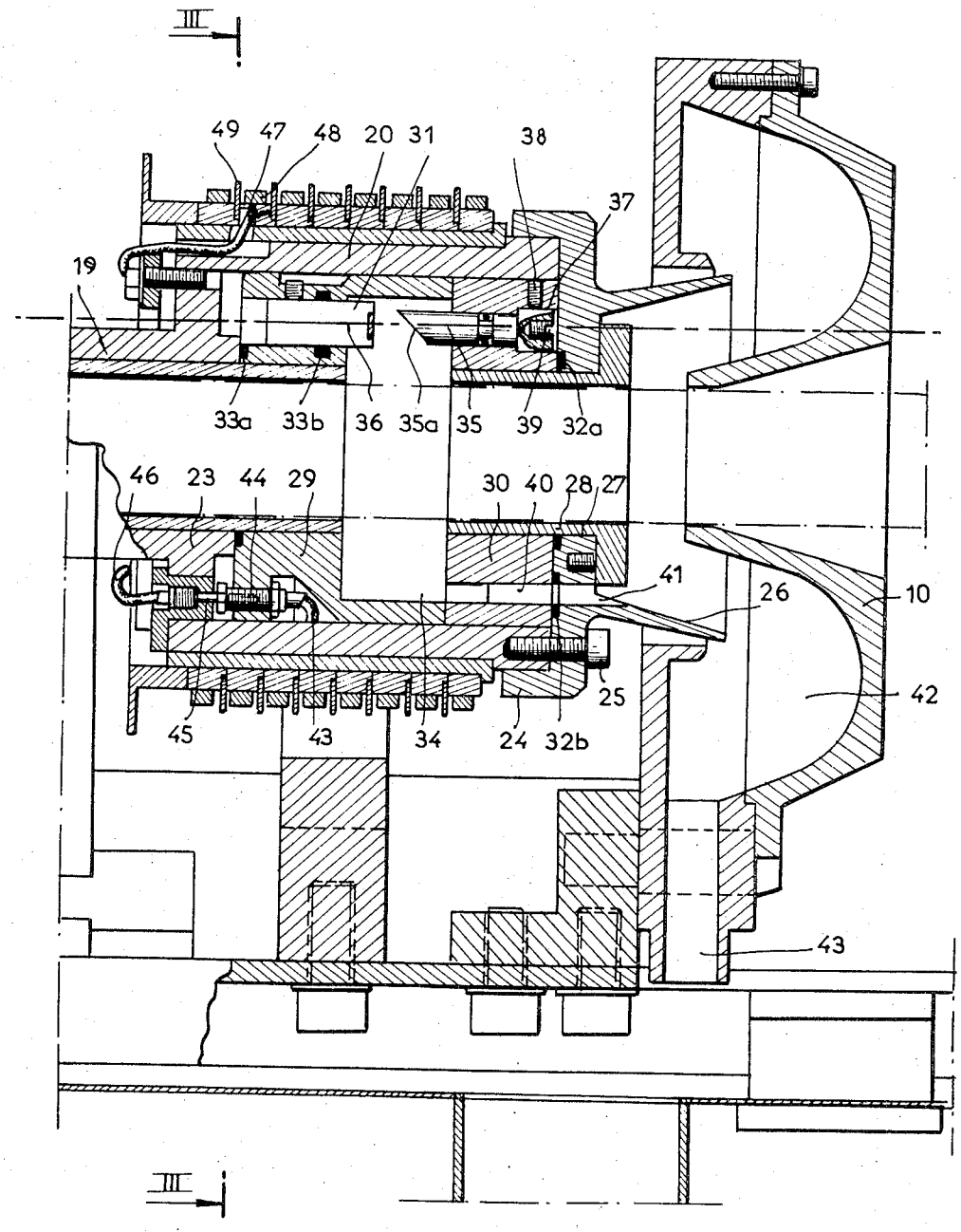

FIG. 2, a sectional elevation on a larger scale of the rotary head.

Figure 3:
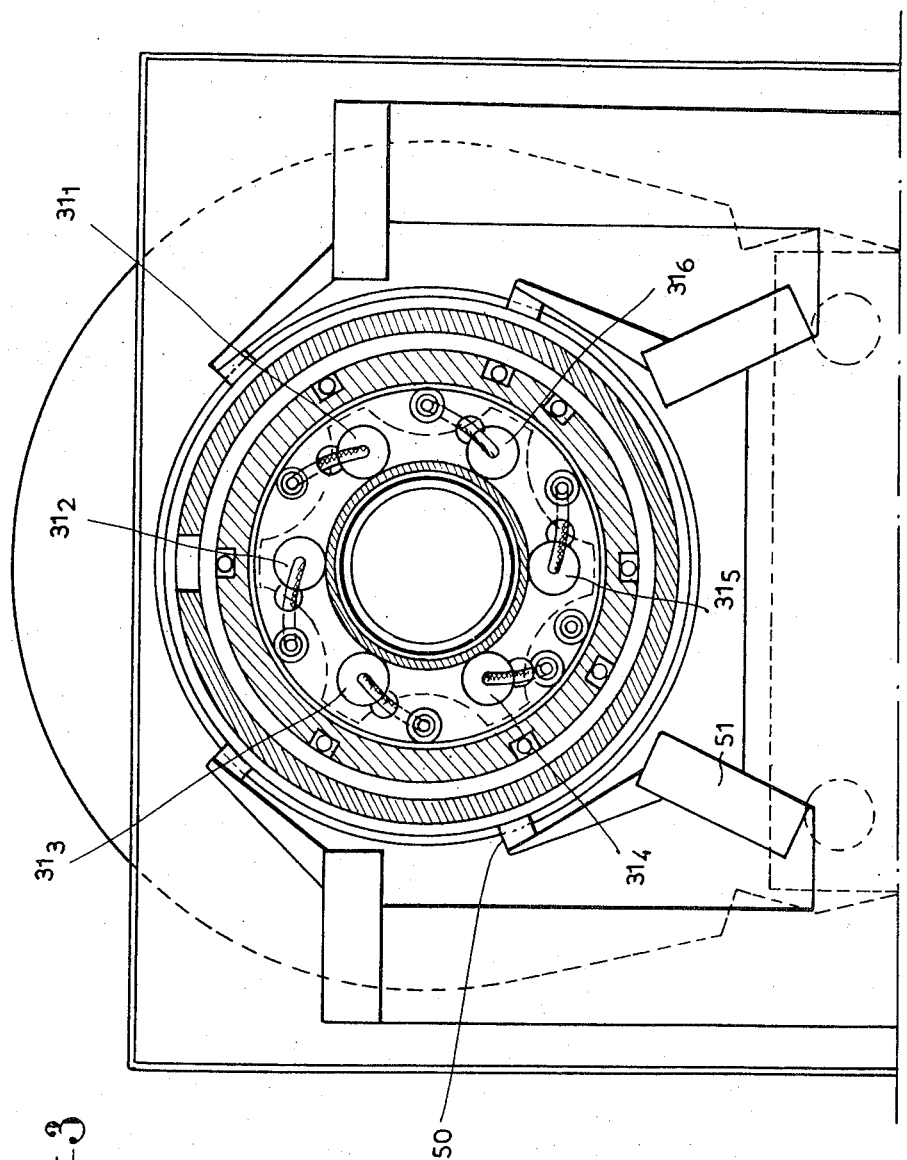

FIG. 3, a transversal section along III—III in FIG. 2.

The machine as shown in FIG. 1 basically comprises a receptacle 1 mounted on a leg 2 and inside the receptacle a stand 4 supported by columns 3. The stand 4 supports the main parts of the machine, i.e.: on the left, a base 5 itself carrying two bearing supports 8, which supports are held by screws or bolts 9 (not shown in detail), and on the right, a collector brush support 6 and a support 7 for the water-return nozzle 10. The supports 8 are hollowed out in order to contain fitted rings 11a, 11b, the ring 11a being equipped with a fitted extension 12 with a casing 13 backed against and fixed to it. Each support 8 contains, near the periphery 8a thereof, wedging means 8b, 8d, 8e through which screws 8c go, so arranged as to hold the outer ball-race crown 15, the inner crown of which is seated on a rotary part which will be described later on. Between the left-hand ball-race, the part 12 and the casing 13, there is a hollow lined with a pressure sealing device 16a, 16b, 16c which is not described in detail, as it is not part of the invention.

In the casing 13, and concentrically on the general axis, a flanged tube 18 is fitted, whose inside diameter is only slightly larger than the diameter of the product to be tested. The guide tube 18 extends to the right, up to the level of the testing chamber which will be described later. A feed tube 14 screwed on the casing serves as a liquid inlet which, via a hole 17, can reach the outer surface of the tube 18.

To the right of the second support 8 there is a hollow cylindrical block 20, which constitutes the testing chamber rotor. The block 20 extends to the left via a hollow shaft 19, whose outside diameter corresponds to the inside diameter of the ball-race crowns. A driving pulley 21 is wedged against the shaft 19, wedging rings 22 being provided between this pulley and the inside ball-race crowns.

With reference to FIG. 2, the most characteristic components of the invention will now be described. The rotary block 20 is in the shape of a pot opening towards the shaft 19, the inside of this pot being cylindrical and the bottom where the hollow shaft 19 ends is raised by a stop projection 23. The block 20 is closed with a lid 24 fixed with screws 25, this lid being pierced in the centre by a hole 27 which opens on to a conical deflector 26 integral with said lid. A guide 28 with the same inside and outside diameters as the guide 18 is fixed on to the lid 24 by means of a small flange. It will be observed that the guide 28 forms a precise extension of the guide 18 but that the guide 18, integral with the casing 13 (FIG. 1) is stationary while the guide 28 rotates with the block 20. The lid 24 comprises, on the surface facing towards the pot, grooves to house tore-shaped joints 32a, 32b.

The cylindrical interior of the pot makes it possible to house two insulating blocks 29, 30, which are adjacent and whose length is such that the block 29 on the left rests on the stop surface 23, with a tore-shaped joint 33a interposed. The insulating block 29 is made with an inward hollow so as to form, together with the opposite face of the block 30, a chamber 34 which can either be completely annular or set out in a plurality of radial chambers separated by partitions. Transducers 31, which both emit and receive ultrasonic waves, are housed in the block 29 and give on to the chamber 34, their longitudinal axis 36 being parallel to the axis of the machine. Facing the transducers, in the block 30, there are metal parts forming mirrors by means of a bevel 35a, these parts as a whole being cylindrical and their axis being in concordance with the axis 36. If the bevel of the part 35 is, as can be seen in FIG. 2, cut at 45°, it is obvious that the ray reflected by the mirror will be perpendicular to the general axis and that the sound echo will follow the same path. However, the bevel may be cut at different angles if it is desired to alter the orientation of the beam in a plane parallel to the axis of the head. Moreover, by rotating the mirror 35 in its housing, a correction can be made to the ray in a plane perpendicular to the axis. For this purpose, the part 35 has a cylindrical back-body 37 which is wedged with a locking screw 38, while a screw slot 39 makes this adjustment possible.

The advantage of placing the two axes of the transducer and the mirror in line and parallel to the main axis is that it reduces the diameter of the pot 20 as much as possible, thus giving the minimum of inertia and bulk. The insulating part 30 moreover comprises a calibrated hole 40 for evacuation of the water. The hole 40 extends into the lid 24 by a hole 41, which gives into the basin 26 forming a deflector. The deflector is positioned concentrically to the hollow 42 in a nozzle 10. The nozzle 10 evacuates the water to the receptacle 1 via a conduit 43 at the bottom thereof.

It can be seen that the mounting of the two blocks 29 and 30 is easily interchangeable. If it is desired to change the characteristics of the transducers, the block 29 can very quickly be replaced with another, ready in advance. To make this exchange possible, a method of connecting the electric leads which can be pinned must necessarily be available.

FIG. 3 shows that the transducers number six $31_1$, $31_2$, $31_3$, $31_4$, $31_5$, $31_6$. The connecting lead 43 of a transducer connects to a contact-socket 44, which takes a plug 46. The plug 46 is connected by means of a coaxial cable 47 to one of the rings 48 on the external collector. Each collector ring is separated from the next by an electric screen 49. The rings are collected by sliding contacts 50, themselves connected to junction boxes 51 which are not described in any greater detail.

The interchangeability of the blocks 29 and 30 provides yet another advantage, which is pre-adjustment of the mirrors. As the reproducibility of adjustments is not always good, it is often necessary to make the adjustment on a standardising part. In the solution adopted, it is sufficient to put in position the block bearing the mirrors, which it will have been possible to adjust in the laboratory. Moreover, this block, which comprises no fragile components, is inexpensive.

As regards water circulation, it should be noted that this first of all passes around the guide-tube 18. As this part is very long, i.e. more than four times the length of the rotating guide, the water leak which might occur through the gap between it and the bar being tested must be very slight. The water is evacuated along the exit guide 28 and through the calibrated hole 40.

It should be noted that, by virtue of the centrifuging, the testing chamber is free from bubbles and does not empty in the absence of a bar or a tube. Acoustic coupling is instantly re-established as soon as the product penetrates into the chamber. Thus the ends of the bar or tube can be tested in the same way as the other portions, this being a new advantage in this kind of apparatus.

It is evident that the construction of the machine may be modified in various ways without thereby departing from the scope and the spirit of the invention.

What is claimed is:

1. Ultrasonic inspection apparatus for cylindrical elongated elements, comprising:
   a rotatable housing;
   a liquid containing chamber formed in said housing and having left and right side ports for receiving and passing a cylindrical elongated element through said chamber along an axis between said ports;
   a liquid within said chamber and drive means for rotating said chamber about said axis;
   guide means for guiding said cylindrical elongated element along said axis within said chamber and through said ports; first and second blocks mounted independently removable within said housing and connected thereto;
   a plurality of ultrasonic transducers mounted on the first block;
   electrical connector means, whereby said transducers may be connected to ultrasonic transmitting and receiving equipment for transmitting and receiving an ultrasonic beam of energy;
   and a plurality of acoustic mirrors mounted on the second block, each of the transducers cooperating with one associated mirror, the transducer and the associated mirror having a common axis which is parallel to the said axis and being positioned facing each other whereby substantially the whole energy of the ultrasonic beam is transmitted from the transducer to the associated mirror and vice-versa.

2. Ultrasonic inspection apparatus as claimed in claim 1, wherein each of the mirrors is in the shape of a cylinder mounted within a housing in the second block and having a bevelled reflecting base surface, means cooperating with the said cylinder for adjusting the angular position of the cylinder within the housing.

3. Ultrasonic inspection apparatus as claimed in claim 1, wherein the housing is shaped as a generally cylindrical pot having left and right end openings, a hollow shaft connected to said drive means being mounted in the left end opening, the first block being generally of annular shape and mounted adjacent the hollow shaft within the housing, the second block being of generally annular shape and mounted in the right end opening, a stationary tube being mounted concentric with the hollow shaft and the first block and forming an annular space therewith, a further tube being mounted concentric to the second block and integral therewith, the first and second blocks being spaced apart so as to define the said chamber, and means for introducing the said liquid through said annular space within said chamber.

* * * * *